United States Patent
Hoag et al.

(10) Patent No.: US 10,755,339 B2
(45) Date of Patent: Aug. 25, 2020

(54) SYSTEM AND METHOD OF PURCHASE REQUEST MANAGEMENT USING PLAIN TEXT MESSAGES

(71) Applicant: Teampay, Inc., New York, NY (US)

(72) Inventors: Andrew Hoag, New York, NY (US); Justin Oblak, New York, NY (US); Preston Hale, Brooklyn, NY (US)

(73) Assignee: Team Labs, Inc., New York, NY (US)

( * ) Notice: Subject to any disclaimer, the term of this patent is extended or adjusted under 35 U.S.C. 154(b) by 400 days.

(21) Appl. No.: 15/696,998

(22) Filed: Sep. 6, 2017

(65) Prior Publication Data
US 2018/0268461 A1 Sep. 20, 2018

Related U.S. Application Data

(60) Provisional application No. 62/473,224, filed on Mar. 17, 2017.

(51) Int. Cl.
*G06Q 30/00* (2012.01)
*G06Q 30/06* (2012.01)
*G06Q 10/08* (2012.01)

(52) U.S. Cl.
CPC ......... *G06Q 30/0635* (2013.01); *G06Q 10/08* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 5,758,327 A | * | 5/1998 | Gardner | G06Q 10/087 705/26.82 |
| 5,883,810 A | * | 3/1999 | Franklin | G06Q 20/02 235/379 |
| 6,035,104 A | * | 3/2000 | Zahariev | H04L 51/14 379/100.08 |
| 6,314,468 B1 | * | 11/2001 | Murphy | H04L 63/0428 709/217 |
| 7,743,150 B1 | * | 6/2010 | Carter | G06F 9/546 709/227 |
| 8,160,979 B1 | * | 4/2012 | Evans | G06F 16/334 706/45 |
| 10,171,662 B1 | * | 1/2019 | Zhou | H04L 51/02 |
| 10,356,243 B2 | * | 7/2019 | Sanghavi | H04M 1/72552 |

(Continued)

OTHER PUBLICATIONS

Minghua He et al. "On Agent-Mediated Electronic Commerce" IEEE Transactions on Knowledge and Data Engineering, vol. 15, No. 4, Jul./Aug. 2003 (pp. 985-1003) (Year: 2003).*

(Continued)

*Primary Examiner* — Naeem U Haq
(74) *Attorney, Agent, or Firm* — Perkins Coie LLP

(57) ABSTRACT

The systems and methods may identify order requests from internal messaging or collaboration systems. Once order requests are identified, the systems and methods determine purchase orders based on the requests, and generate tokens (e.g., virtual credit cards) specific to a purchase order, to be used by the requestor to complete the purchase of requested items or services. Once the tokens are used, the systems and methods may then track the purchases in various databases, providing the organization with various views or insights into their employee's expenditures.

16 Claims, 6 Drawing Sheets

(56) References Cited

U.S. PATENT DOCUMENTS

| | | | | |
|---|---|---|---|---|
| 2002/0138358 A1* | 9/2002 | Scheer | ............... | G06Q 10/063 |
| | | | | 705/7.36 |
| 2002/0143598 A1* | 10/2002 | Scheer | .................. | G06Q 10/06 |
| | | | | 705/7.26 |
| 2002/0143669 A1* | 10/2002 | Scheer | ............... | G06Q 10/087 |
| | | | | 705/28 |
| 2002/0161674 A1* | 10/2002 | Scheer | .............. | G06Q 10/0631 |
| | | | | 705/28 |
| 2003/0182391 A1* | 9/2003 | Leber | .................. | G06F 16/951 |
| | | | | 709/217 |
| 2004/0243501 A1* | 12/2004 | Duffey, Jr. | .......... | G06Q 10/107 |
| | | | | 705/37 |
| 2005/0240493 A1* | 10/2005 | Johnson | ............... | G06Q 30/06 |
| | | | | 705/26.41 |
| 2006/0089885 A1* | 4/2006 | Finke | .................. | G06Q 10/087 |
| | | | | 705/14.1 |
| 2017/0323241 A1* | 11/2017 | Gauba | ............... | G06Q 10/087 |

OTHER PUBLICATIONS

Margaret L. Sheng "The Impact of Internet-Based Technologies on the Procurement Strategy" The Second International Conference on Electronic Business Taipei, Taiwan, Dec. 10-13, 2002 (Year: 2002).*

Amy R. Greenwald et al. "Shopbots and Pricebots" AMEC'99, LNAI 1788 © Springer-Verlag Berlin Heidelberg 2000 (Year: 2000).*

Kartik Subrannanian et al. "Intelligent Agent Platform for Procurement" Published 1999 Computer Science IEEE SMC'99 Conference Proceedings. 1999 IEEE International Conference on Systems, Man, and Cybernetics (Cat. No.99CH37028) (Year: 1999).*

* cited by examiner

| DATE | TOKEN ID | VENDOR | CATEGORY | AMOUNT | TYPE | CONTACT | DESCRIPTION |
|---|---|---|---|---|---|---|---|
| 01.12 | 1123 1223 1223 1234 | AMAZON | SUPPLIES | $34.99 | ONE TIME | JUSTIN | OFFICE SUPPLIES |
| 01.12 | 1123 1223 1223 1235 | APPLE | COMPUTER | $999.00 | ONE TIME | ANDREW | LAPTOP FOR NEW DEVELOPER |
| 01.13 | 1123 1223 1223 1236 | APPLE | COMPUTER | $119.00 | ONE TIME | ANDREW | MOUSE AND KEYBOARD |
| 01.15 | 1123 1223 1223 1237 | DOCSEND | SOFTWARE | $15.00 | RECURRING | JUSTIN | DOC TRACKING SERVICE |
| 01.17 | 1123 1223 1223 1238 | AMAZON | GIFT | $45.99 | ONE TIME | ANDREW | WINE FOR NEW CLIENT |

*FIG. 5*

SYSTEM AND METHOD OF PURCHASE REQUEST MANAGEMENT USING PLAIN TEXT MESSAGES

CROSS-REFERENCE TO RELATED APPLICATIONS

This application claims priority to U.S. Provisional Patent Application No. 62/473,224, filed on Mar. 17, 2017, entitled SYSTEM AND METHOD OF PURCHASE ORDER MANAGEMENT USING PLAIN TEXT MESSAGES, which is incorporated by reference in its entirety.

BACKGROUND

Purchasing departments in companies and other organizations handle many different tasks—from provisioning supplies to authorizing purchases of computing and other infrastructure resources. These task may be simple or complex, but often have associated procedures that employees follow to initiate and complete a purchase. For example, an employee may fill out various order forms and approval documentation before submitting a request for an item, service, or other expenditure.

Further, organizations may have and/or apply a complex set of rules to such processes. The rules may identify, among other things, the level of authorization assigned to an employee or group, the types of purchases, budgets or general approval processes, and so on. As an organization grows, its ability to track and efficiently manage the many different ongoing processes may decrease, leading to inefficiencies of workflows, poor utilization of its internal resources, and costlier operations, among other drawbacks.

Therefore, it would be advantageous to an organization, company, or entity to have access to an efficient and simplified system that manages its internal purchasing operations.

BRIEF DESCRIPTION OF THE DRAWINGS

Embodiments of the present technology will be described and explained through the use of the accompanying drawings.

FIG. 5 is a diagram illustrating an example user interface that presents a view of transactions performed via the purchasing system.

Figure 1A:
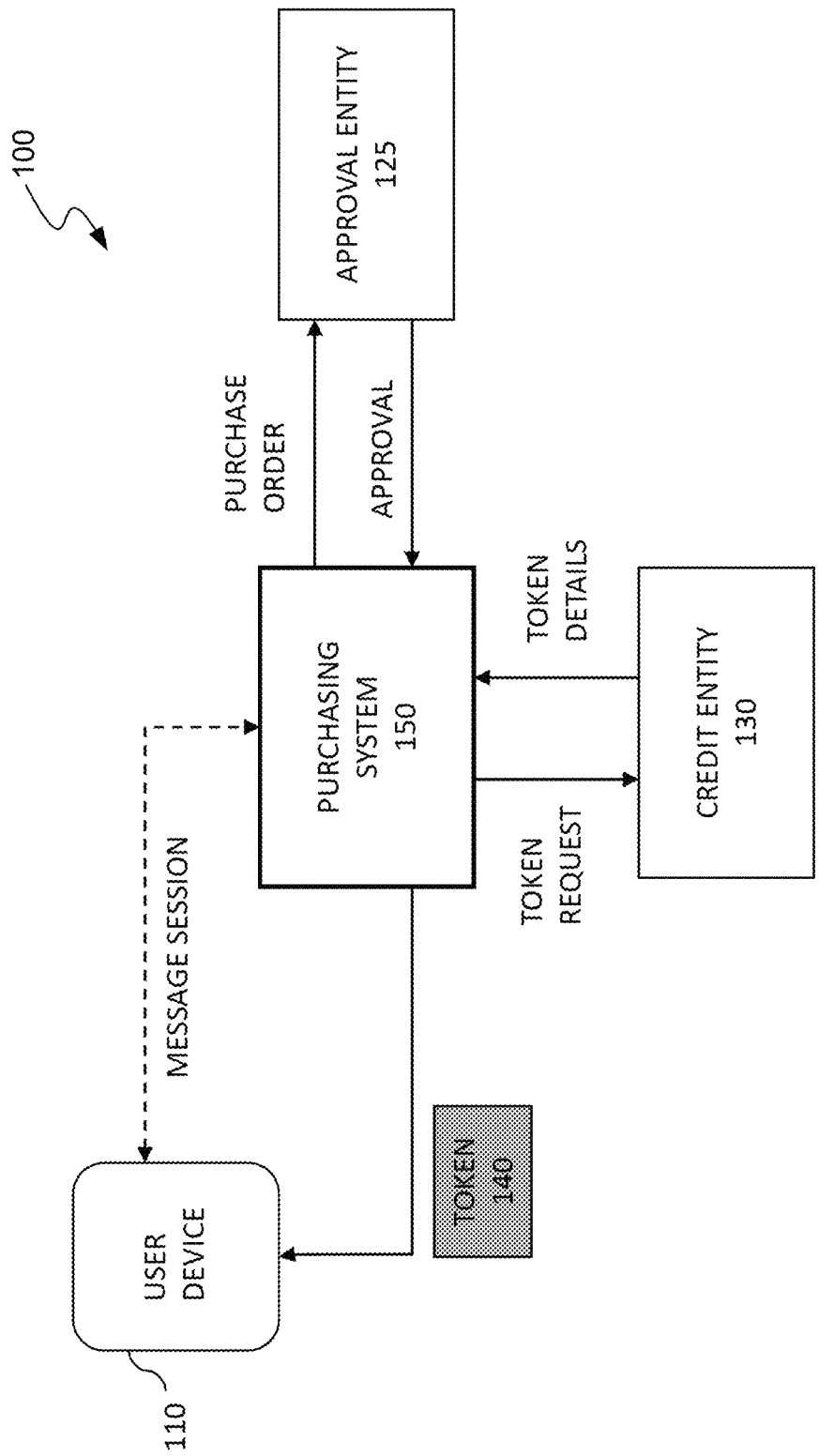
FIGS. 1A-1B are block diagrams illustrating a suitable computing environment for managing purchase order operations for an organization.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for managing purchase orders within an organization, such as a company, entity, or other business or group of individuals. The systems and methods may identify order requests from internal messaging or collaboration systems. Once order requests are identified, the systems and methods determine, generate, or create purchase orders based on the requests, and generate tokens (e.g., virtual credit cards) specific to a purchase order, to be used by the requestor to complete the purchase of requested items or services. Once the tokens are used, the systems and methods may then track the purchases in various databases, providing the organization with various views or insights into their employee's expenditures.

For example, in some embodiments the systems and methods manage purchasing operations for an organization by accessing one or more messages associated with an employee of an organization, where, in some cases, the one or more messages are sent between the employee and a virtual bot associated with a purchasing system. The systems and methods parse and/or extract purchase order information associated with a request from the employee to purchase an item or service, and generate a purchase order object using the extracted purchase order information, which may include parameters for the request to purchase the item or service.

Upon receiving authorization for the purchase order object (or, automatically authorizing the purchase), the systems and methods generate a token specific to the purchase order object (e.g., a virtual credit card), which may be configured to be utilized by the employee to purchase the requested item or service, and provide the generated token to the employee of the organization.

Thus, in some embodiments, the systems and methods access messages associated with an employee of the organization, parse the accessed messages to identify parameters for a purchase order associated with purchasing an item for the employee, and generate a token that is specific to the identified parameters for the purchase order, which may then be used by the employee when purchasing the item (or service).

The systems and methods, therefore, may generate or create tokens unique to specific or individual purchases of items or services, such as supplies, computing devices, software or online services, and/or other expenditures requested by employees to assist them in performing their tasks as employees and/or running aspects of the organization.

As an example, the systems and methods may simplify complex accounting procedures for certain purchases, such as costs associated with legal or regulatory filings to courts, agencies, and so on. By assigning or issuing multiple, unique tokens to the purchases, the systems and methods track both the account of the purchase (in the accounting system, what ledger account) m as well as additional cost dimensions, such as client ID, project code, office location, and so on. More complex organizations use many dimensions to categorize an expense in their accounting system. In issuing two different tokens with different categorization and client data for the purchases, the systems and methods automatically assign the purchase costs to the right accounts (which could be many), avoiding complexity of categorization, among other benefits.

In a way, the systems and methods relate to technology that may augment, enhance, or simply replace an organization's purchasing department. The technology frees up organization resources and provides efficient processes for authorizing purchases, tracking transactions, and managing internal operations, among other benefits.

Further, in generating tokens for purchase orders that are unique and/or specific to underlying purchase orders associated with the tokens, and tracking purchases and other operations associated with the tokens, the systems and methods enable organizations to create new and enhanced databases of transactions.

These databases may store information relating the token, specific credit card, virtual currency (e.g., smart or other electronic contracts, such as bid contracts), and so on used to purchase an item along with purchase orders and other metadata associated with the purchase. An organization, therefore, may utilize such a database to identify recurrences in purchase order requests, determine trends in costs or purchases, track expenditures at individual, team, class, group, or other organization hierarchy levels, and so on.

The systems and methods described herein, therefore, provide an organization with a simplified, efficient mechanism for controlling purchases within an organization, from an initial request (or discussion about a request), through purchase and receipt of requested goods, among other benefits.

In the following description, for the purposes of explanation, numerous specific details are set forth in order to provide a thorough understanding of embodiments of the present technology. It will be apparent, however, that embodiments of the present technology may be practiced without some of these specific details.

Examples of a Suitable Network Environment

Systems and methods for managing purchase orders for an organization, generated from initial requests through purchase tracking and management, are described. FIG. 1A depicts an example flow of operations 100 when managing and controlling purchase orders for an organization.

As shown, a user device 110 associated with a user (e.g., an employee of the organization) exchanges messages with the organization, such as email messages, chat or instant messages, messages within a collaboration tool (e.g., Slack), and so on. A purchasing system 150, which may include or perform the systems and methods described herein, may access the various messages and/or interact with the user by exchanging messages.

During the exchange of messages, the purchasing system 150 identifies that the user wishes to purchase an item. The system 150 may determine that the user associated with device 110 would like to purchase a toner cartridge for his printer, and extract from the messages, parameters for the request to use in generating a purchase order. For example, the system may extract (or receive) information identifying the type of toner, a vendor for the toner, a cost of the toner cartridge, a delivery preference (or date needed), among other information.

Using the extracted information, the system 150 generates a purchase order object, and sends the purchase order object to an approval entity 125 of the organization, such as an authorized employee (e.g., a group or human resources manager), an automated system, or other entities or systems capable of authorizing and/or approving purchase orders, when applicable.

Once authorization is received, the system 150 sends a request to a credit entity 130 (e.g., an associated bank or financial institution) to receive a token or virtual currency (coin, smart contract, bid contract, and so on) to be used by the employee to purchase the toner cartridge. The credit entity 130, in response to the request may issue credit to the system 150, which then generates a token 140 (e.g. a credit card number, an amount of virtual currency/crypto-currency, a code (e.g. contract ID code), and so on) that is representative of the issued credit and is specific to the requested item for purchase (e.g., the toner).

The system 150 then provides the generated token 140 to the user device 110, and the user purchases the toner cartridge using the token via a vendor. The system 150 may track use of the token 140, and update a database of transactions to include an entry that identifies the toner cartridge purchase, the token 140 used for the purchase, the employee that purchased the toner cartridge, and other information.

Figure 1B:
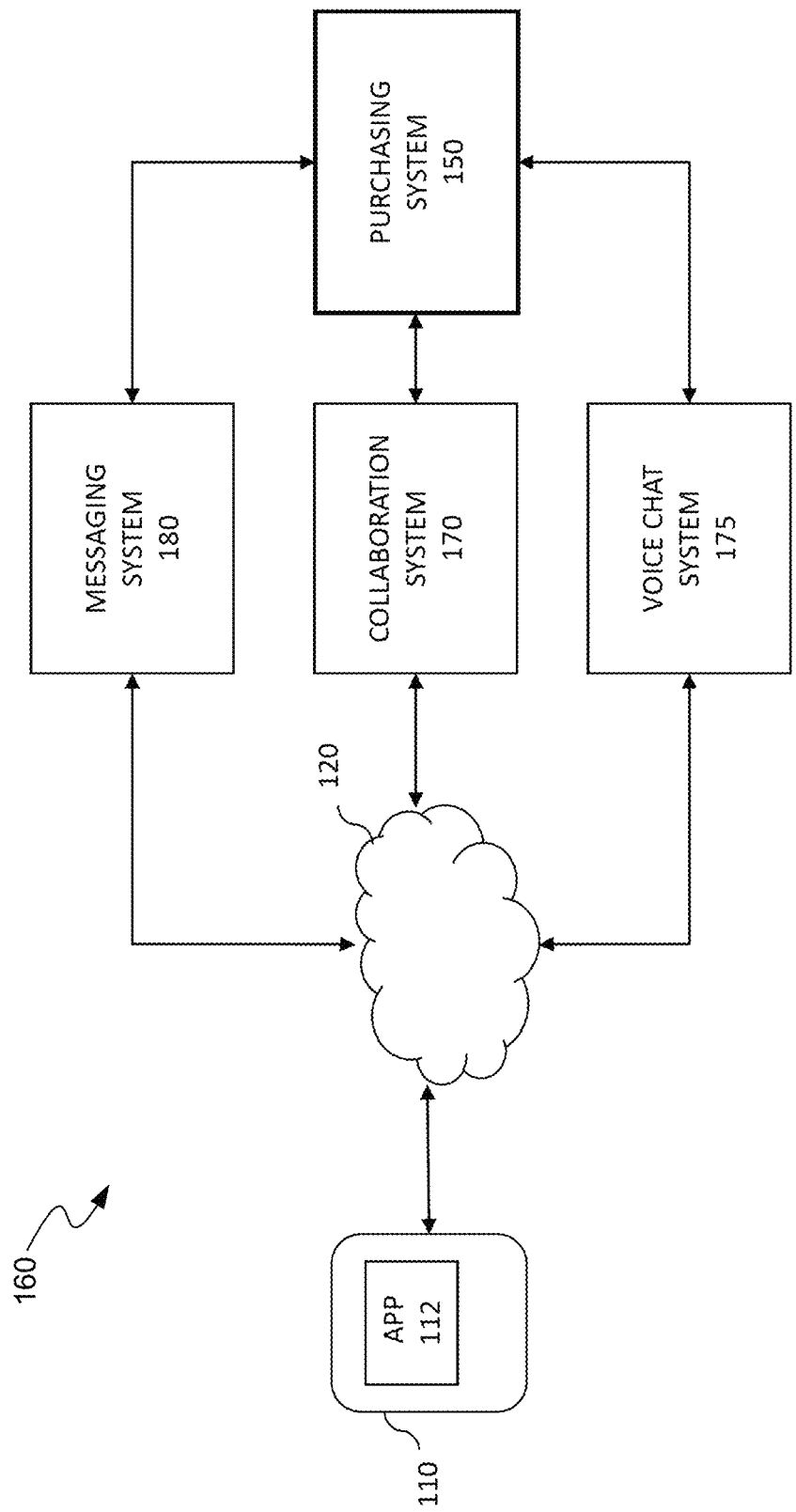

FIG. 1B depicts a suitable computing environment 160 for managing purchase order operations for an organization. As described in FIG. 1A, a user device 110, such as a laptop, mobile device, or other computing device, may exchange messages over a network 120 with the purchasing system 150, via one or more messaging systems or protocols.

As shown, the purchasing system 150 may access communications within a collaboration system, tool, or service 170, such as Slack or various organization intranet services. For example, the system 150 may utilize a virtual chat bot configured to exchange messages with employees within the collaboration tool platform and parse or extract purchase order information or other order requests from the messages.

The system 150 may also access other communication systems or protocols, such as voice chat systems 175 and/or messaging systems 180, such as email systems, text message systems, and so on. For example, the system 150 may provide an IP address, username (e.g., "@hr_ordering"), phone number, dedicated device (e.g., a voice communications device, such as the Amazon Echo), and so on, and interact with users via messages or voice communications.

The purchasing system 150, therefore, identifies or receives user purchase requests by interacting with users and parsing messages from the interactions or conversations for information or parameters related to the purchase requests. As will be described in further detail here, the system 150 is configured to then generate purchase orders (or other similar objects) from the messages, and provide tokens and other virtual currency or credit objects to users when making purchases, among other things.

The user device 110 may be a tablet computer, mobile device, smart-phone, net-book, mobile GPS navigation device, voice controlled device, or any other device that supports, presents, and/or displays apps or programs via a user interface, such as a touch-screen, of the device. The user device 110 may include various hardware and/or software components in order to provide such functionality. For example, the user device 110 may include various human interface components, processing components, device components, memory, voice recognition components, and so on.

The network 120 may be a Local Area Network (LAN), a Wide Area Network (WAN), the Internet, various different telecommunication networks (4G, LTE, and so on), or other networks capable of facilitating various communications between computing devices.

FIGS. 1A-1B and the discussion herein provide a brief, general description of a suitable computing environment in which the purchasing system 150 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, voice-controlled devices, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIGS. 1A-1B may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Managing Purchase Order Operations for an Organization

As described herein, the systems and methods control purchase order operations for various organizations, such as companies of all sizes (e.g., companies of 50 employees or larger, where at least some resources are generally dedicated to handling purchase orders and other employee requests for goods, supplies, items, or services).

Figure 2:
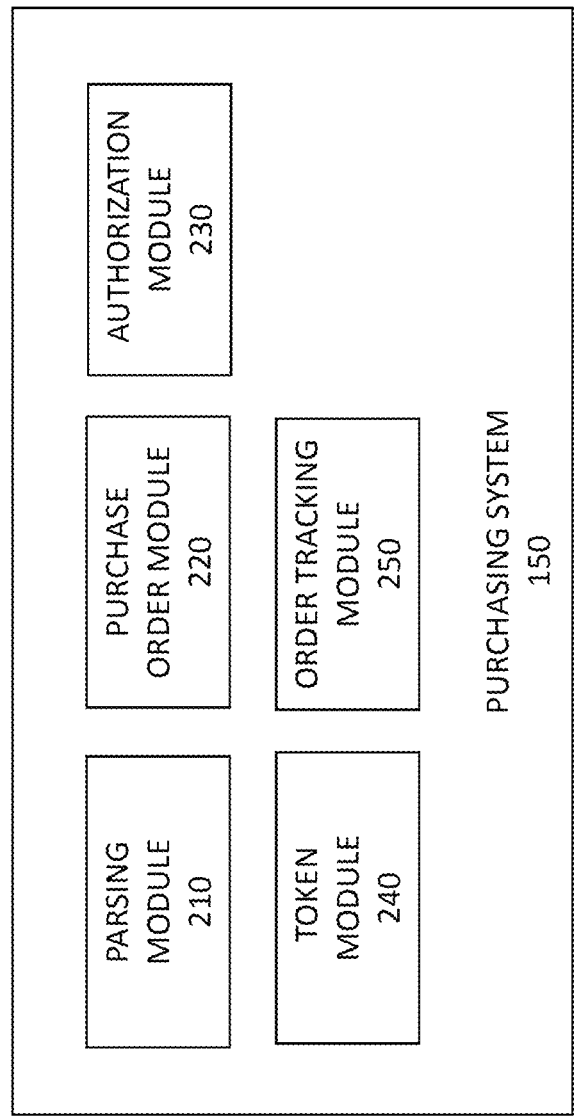
FIG. 2 is a block diagram illustrating components of a purchasing system configured to manage purchase orders within an organization.

FIG. 2 is a block diagram illustrating components of the purchasing system 150, which may be configured to manage purchase orders within an organization. The purchasing system 150 may include one or more modules and/or components to perform one or more operations of the purchasing system 150. The modules may be hardware, software, or a combination of hardware and software, and may be executed by one or more processors. For example, the purchasing system 150 may include a parsing module 210 (or, extraction module), a purchase order module 220, an authorization module 230, a token module 240, and an order tracking module 250.

In some embodiments, the parsing module 210 is configured and/or programmed to access one or more messages associated with an employee of an organization and extract, from the accessed one or more messages, purchase order information associated with a request from the employee to purchase an item or service. For example, the parsing module 210 parses messages or other plain text to identify a description of the item or service, a vendor providing the item or service, and an amount to purchase the item or service, from the messages.

The parsing module 210 may follow a parsing tree or other schema when parsing messages, in order to identify words or phrases that are indicative or associated with a description, vendor, price, amount, quantity, and so on. For example, given a set of messages of "I'd like to get a new monitor for each member of my team" followed by "the Apple 20 inch costs 289 sold on Amazon, and I need four of them," the parsing module 210 extracts the following purchase order information:

Item: Apple 20 inch monitor (indicated by "like to get");
Price: $289.00 (indicated by "costs");
Vendor: Amazon (indicated by "sold on"); and
Quantity: four (indicated by "I need" and "of them").

As described herein, the system 150, via the parsing module 210, accesses or utilizes various communications systems supporting messaging between employees and other employees and/or virtual bots or assistants. For example, the parsing module 210 may access one or more messages within a conversation supported by a collaboration tool of the organization (e.g., Slack).

As another example, the parsing module 210 accesses the one or more messages within a messaging system of the organization, where the one or more messages are sent between the employee and a virtual bot associated with the messaging system, and parses the one or more messages to identify a description of the item or service, among other information. Example messaging systems or protocols include email applications, messaging application, voice-controlled or voice interaction applications, text messaging applications, instant messaging applications, and so on.

Of course, the purchasing system 150 may access other systems or platforms configured to provide information associated with a purchase order. Browser plugins or extensions (e.g., that send information from web sites viewed by employees), various web or application interfaces (e.g., shopping buttons), order forms, imaging systems (that capture images of products), and so on, may provide information to the system 150 that is sufficient for the system 150 to generate a purchase order (as described herein).

In some embodiments, the purchase order module 220 is configured and/or programmed to generate a purchase order object using the extracted purchase order information. The purchase order object may be a digital purchase order or other data structure, and include parameters for the request to purchase the item or service, such as those extracted by the parsing module 210.

In some embodiments, the authorization module 230 is configured and/or programmed to receive authorization for the purchase order object. For example, the authorization module 230 may submit the purchase order object to the approval entity 125 for approval by an automated approval system or, in some cases, another employee of the organization (e.g., an employee of human resources).

As another example, the authorization module 230 may determine the parameters of the purchase order object indicate a recurrence of the purchase order object being received by the purchasing system 150, and automatically authorize the purchase order object based on the purchase order object being a recurrence of a previously authorized purchase order object within the organization.

The purchasing system 150 may, therefore, be configured to identify recurrences of purchase orders and/or requests (e.g., subscriptions to services), and authorize such requests based on historical approvals or authorizations of similar requests. For example, an organization may perform monthly orders for food or beverages from a vendor, and, in identifying a new order that is similar to at least some of the previous monthly orders, the purchasing system 150 may automatically authorize such orders upon receipt.

In some cases, the authorization module 230 follows multiple different rules when automatically authorizing a purchase order object. For example, the authorization module 230 may authorize a purchase order based on various different combinations of a price limit, a time of day or day of week, at least one product or service category, a title of the employee or authorized representative, a department in which the employee or authorized representative work within the organization, a number of purchase requests made by the employee or authorized representative within a given time period, whether the requested item or service has been requested previously by the organization, and/or other factors described herein.

In some cases, the authorization module 230 may follow other rules or instructions and automatically authorize certain purchase orders. For example, certain employees may be associated with automatic authorizations (e.g., department managers, executives, and so on), orders under certain amounts may be authorized without additional approval, orders with certain vendors may be automatically approved, and so on. The purchasing system 150 may enable an organization to configure or set such rules, further providing the organization with control in how purchase orders are handled within the organization.

In some embodiments, the token module 240 is configured and/or programmed to generate a configurable payment token specific to the purchase order object, where the generated token is configured to be utilized by the employee to purchase the requested item or service, and provide the generated token to the employee of the organization. For example, the token module 240 may generate (or, cause to be issued) a virtual credit card, digital currency (e.g., Bitcoin), or other contractual object having an authorization amount similar to a cost to purchase the item or service.

In some cases, the credit card (or other identifier or code associated with an issued or provisioned credit of payment) may include metadata that identifies the purchase order and restricts use of the credit card only to the purchase of the item or service. For example, the metadata may include an authorization amount, an associated purchase order object, the employee submitting the request to purchase the item or service, a category assigned to the item or service, a vendor from which the item or service is to be purchased, a category assigned to the vendor, a vendor ID, point of sale (POS) ID, and so on.

As described herein, the token or other credit object representative of payment for an ordered good or service may be issued or provided by a bank or other financial institution. However, in some cases, the entity providing aspects of the purchasing system 150 (e.g., a third party that provides the service or platform) may, itself, issue the tokens and extend credit to the organization when issuing the tokens. In other cases, the vendors themselves may issue the tokens, such as for organizations performing many purchases with a certain vendor or vendors.

In providing the tokens to the employees, the token module 240 sends the tokens to the parsing module 210, which inserts the tokens in various messaging systems. For example, the token module 240 may provide a virtual credit card to the employee via the collaboration tool that is accessed by the parsing module 240 (e.g., within a chat communication between the employee and a virtual bot representing the system 150).

In some embodiments, the order tracking module 250 is configured and/or programmed to receive an indication that the employee has purchased the item or service using the generated token, and generate an entry in a purchase order database of the organization for the purchase of the item or service. The generated entry (and other entries of the database) may include a description of the purchased item or service, information identifying a cost of the purchased item or service, information identifying the employee, information identifying the token used to purchase the item or service, and so on.

As described herein, the system 150 may store information relating the token, specific credit card, or virtual currency used to purchase an item along with purchase orders and other metadata associated with the purchase. When new orders are received, an organization may identify recurrences in purchase order requests, and authorize the orders based on determining the orders as recurrences. Further, the organization may build such databases to determine trends in costs or purchases, track expenditures at individual, team, class, group, or other organization hierarchy levels, and otherwise provide data for metric or analysis engines.

For example, the organization may create a database that tracks costs for different categories of objects. Such a database, and its various information, may then be analyzed to identify future savings on purchases and used to provide other organizations with empirical data regarding costs and trends within different categories, among other benefits.

Figure 3:
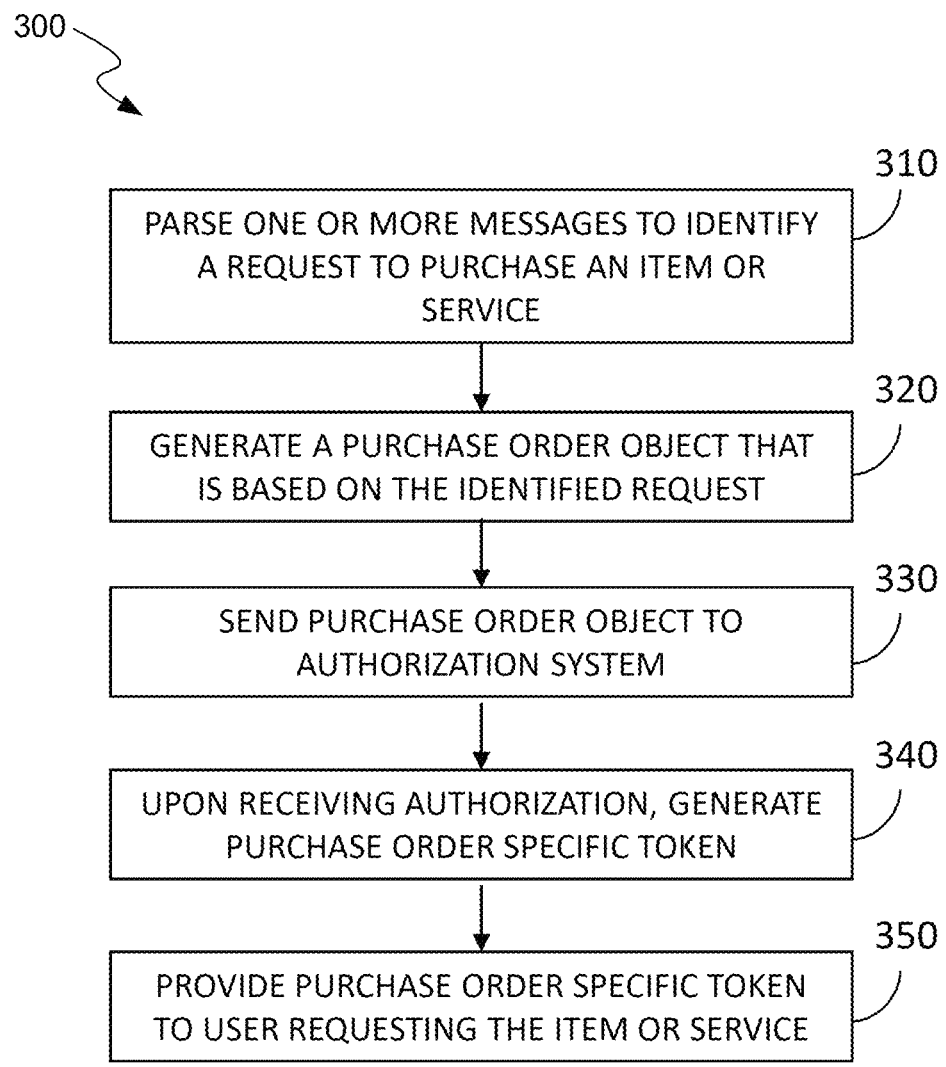
FIG. 3 is a flow diagram illustrating a method for generating tokens in response to determining purchase orders within messages.

Thus, as described herein, the purchasing system 150 may perform various methods, algorithms, routines or processes when managing purchase order operations for an organization. FIG. 3 is a flow diagram illustrating a method 300 for generating tokens in response to determining purchase orders within messages. The method 300 may be performed by the purchasing system 150 and, accordingly, is described herein merely by way of reference thereto. It will be appreciated that the method 300 may be performed on any suitable hardware.

In operation 310, the purchasing system 150 accesses one or more messages associated with an employee of an organization, where, in some cases, the one or more messages are sent between the employee and a virtual bot associated with a purchasing system. For example, the parsing module 210 may access one or more messages within a conversation supported by a collaboration tool of the organization (e.g., Slack), and/or one or more messages within a messaging system of the organization.

Further, the purchasing system 150 extracts, from the accessed one or more messages, purchase order information associated with a request from the employee to purchase an item or service. For example, the parsing module 210 parses messages or other plain text to identify a description of the item or service, a vendor providing the item or service, and an amount to purchase the item or service, from the messages.

In operation 320, the purchasing system 150 generates a purchase order object using the extracted purchase order information, where the purchase order object includes parameters for the request to purchase the item or service. For example, the purchase order module 220 may generate a purchase order object that includes a digital purchase order or other data structure, and includes parameters for the request to purchase the item or service, such as those extracted by the parsing module 210.

In operation 330, the purchasing system 150 receives authorization for the purchase order object. For example, the authorization module 230 may submit the purchase order object to the approval entity 125 for approval by an automated approval system or, in some cases, another employee of the organization (e.g., an employee within a finance department of the organization).

As another example, the authorization module 230 may determine the parameters of the purchase order object indicate a recurrence of the purchase order object being received by the purchasing system 150, and automatically authorize the purchase order object based on the purchase order object being a recurrence of a previously authorized purchase order object within the organization.

In operation 340, the purchasing system 150 generates a token specific to the purchase order object (e.g., a token for every order or every group of orders), where the generated token is configured to be utilized by the employee to purchase the requested item or service. For example, the token module 240 may generate (or, cause to be issued) a virtual credit card, digital currency (e.g., Bitcoin or Ethereum smart contract), or other electronic or digital token or object representing value having an authorization amount similar to a cost to purchase the item or service.

In operation 350, the purchasing system 150 provides the generated token to the employee of the organization. In providing the tokens to the employees, the token module 240 sends the tokens to the parsing module 210, which inserts the tokens in various messaging systems. For example, the token module 240 may provide a virtual credit card to the employee via the collaboration tool that is accessed by the parsing module 240 (e.g., within a chat communication between the employee and a virtual bot representing the system 150).

Figure 4:
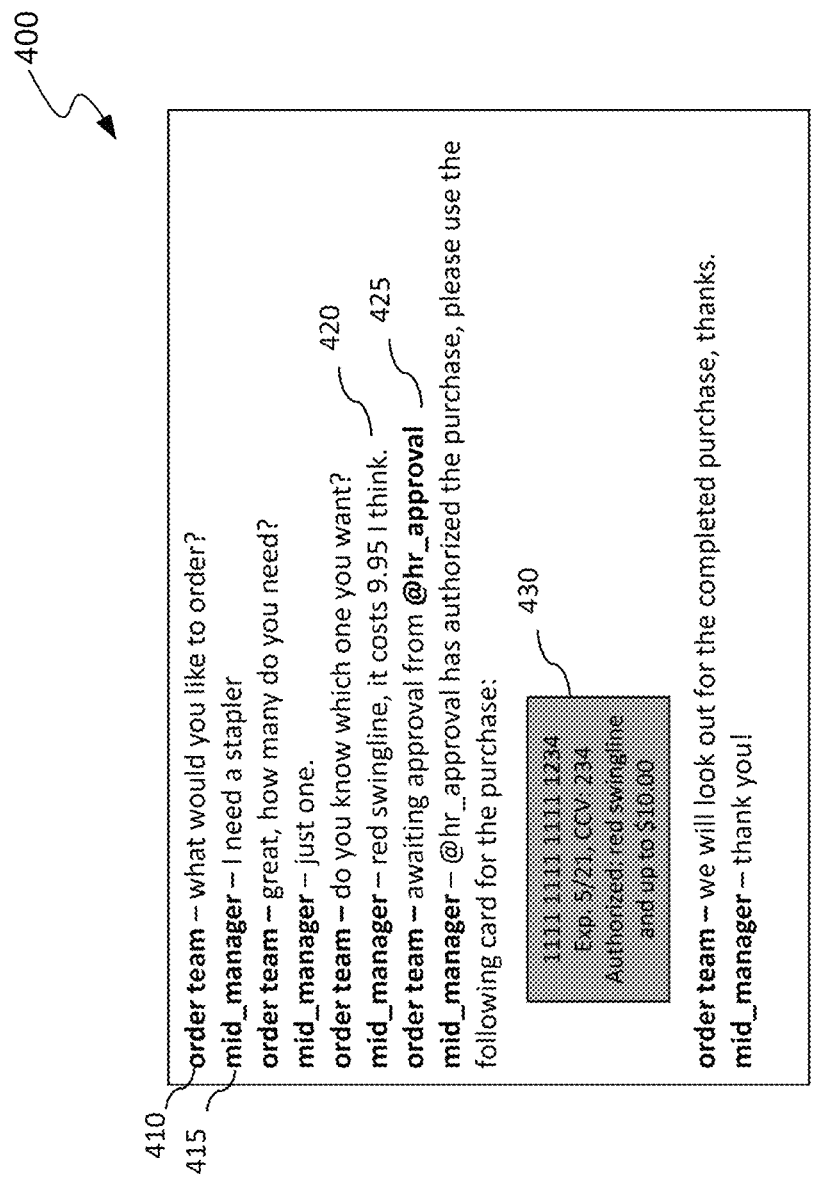
FIG. 4 is a display diagram illustrating an example user interface that presents a message-based conversation between an employee and a purchasing system.

Thus, in some embodiments, the purchasing system 150 performs operations for facilitating the ordering of items or services on behalf of employees via the tools they use during their daily business activities, such as collaboration tools, messaging systems, and so on. FIG. 4 is a display diagram illustrating an example user interface 400 that presents a message-based conversation between an employee and a purchasing system.

As an example, the interface 400 depicts a messaging system within a collaboration tool for an organization. An employee, having a username of "mid_manager," 410 messages the purchasing department, represented by a chatbot having the username of "order team" 415.

The chat bot walks the employee through various questions, and using the systems and methods described herein, identifies information from the messages received from the employee to be used in generating a purchase order. For example message 420 indicates "red swingline, it costs 9.95 I think."

The system 150, via the chat bot, generates a purchase order for a Swingline stapler for $9.95, seeks authorization for the purchase (message 425), and upon receiving authorization, generates and provides a token 430 (e.g., a virtual credit card) to the employee via the messaging system.

As described herein, in generating tokens for purchase orders that are unique and/or specific to underlying purchase orders associated with the tokens, and tracking purchases and other operations associated with the tokens, the systems and methods enable organizations to create new and enhanced databases of transactions.

These databases may store information relating the token, specific credit card, or virtual currency used to purchase an item along with purchase orders and other metadata associated with the purchase. An organization, therefore, may utilize such a database to identify recurrences in purchase order requests, determine trends in costs or purchases, track expenditures at individual, team, class, group, or other organization hierarchy levels, and so on. FIG. 5 is a diagram illustrating an example user interface that presents a view 500 of transactions performed via the purchasing system.

As depicted, the transaction entries may relate various information associated with a complete cycle of operations for a purchase, from initial request, to completed purchase details. Some of the information includes descriptions of the purchased items or services, information identifying costs of the purchased items or services, information identifying the employees, information identifying the tokens used to purchase the items or services (credit card numbers, virtual currency hashes), internal descriptions, transaction types (one time or recurring purchases), whether a transaction was automatically authorized, vendor information, receipts or payment confirmations, order histories, related items, and so on.

In some cases, the view 500 of transaction entries may be sortable for any column of information, and may provide links or access to underlying information or documents. Further, selection of one or more entries (such as a username or vendor), may cause navigation to additional interfaces that present entry specific information. For example, the system 150 may present vendor specific transaction information, user specific transaction information, category specific transaction information, and so on.

Thus, as described herein, the systems and methods access messages associated with an employee of the organization, parse the accessed messages to identify parameters for a purchase order associated with purchasing an item for the employee, and generate a token that is specific to the identified parameters for the purchase order, which may then be used by the employee when purchasing the item (or, service).

Examples of Work Flows for Managing Purchase Orders for an Organization

As described herein, the purchasing system 150 may perform various operations and work flows in order to manage end-to-end purchase operations for an organization. The following are example processes performed by, or supported by, the purchasing system 150.

In some embodiments, the purchasing system 150 extracts relevant metadata from a user's plain text request, and converts the metadata to a purchase order. The system 150 determines a message type, where a user's incoming request in the form of a plain text message or plain voice message is delivered via a messaging application, and is used to determine its "message type" based on a series of algorithms applied to the text. The message type may determine or indicate which pieces of information may be extracted from the message itself.

The system 150 determines message intent, where the message type is combined with the user's current context and an "intent" is determined for that message, which drives certain specific programmatic actions, for example, actions to extract parameters from the message, such as purchase amounts, items, vendors, and others described herein.

The system 150 sets and associates a message context based on the success or failure of the actions driven by the intent. For example, a context may be set and associated with a specific employee. The system 150 may continue processing until a purchase order object is generated.

Once the purchase order object is generated, the system 150 associates the object to an approver or approving function (e.g., entity 125) associated with the user or employee, and routes the object to the approver for approval or rejection. The system 150 generates a formatted message, and displays it to the approver via a messaging application, as well as displaying the object on a system web application. The message presents options to Approve, Deny, or Skip the request, which can be done by responding to the purchase order message via the messaging application or web application display.

The approval process may be performed as follows:

The system 150 generates a purchase request decision message, with details such as: approver identity (e.g., who approved the purchase order); approval amount (the amount the PR is approved for); date and time of approval; and any other information relevant to the purchase order or organization.

The system 150 applies various rules and algorithms to the purchase order to determine the desired payment processor, current funding levels, required funding levels, funding sources, and so on. If funding levels are adequate, the purchase order and decision are used to dynamically generate API requests to a third party payment vendor (e.g., entity 130), which results in a payment token (e.g., the payment token referencing a payment method), to be used at a vendor accepting the designated payment method.

If funding levels are inadequate or not available, the system 150 sends the purchase order into a requires-funding state, and is fulfilled once funding becomes available.

The system 150 may then display or otherwise provide the payment token 140 and/or payment method to an employee requesting a purchase via the messaging services described herein (such as the messaging service used by the employee to submit the initial request), such as depicted in FIG. 4.

Once the employee receives a payment token, the employee may use the payment token at the approved vendor. The system 150 receives notification from the third party payment processor of the state, amount, vendor, and other various metadata of the financial transaction of the issued payment token. This transaction data is then used to create a "Transaction Object" and associate it with the appropriate purchase order, and may be stored in various databases, such as the database depicted in FIG. 5.

Thus, the following scenario is supported and/or enabled by the purchasing system 150: A user accesses a messaging system and initiates a request to purchase a good or service via a plain text message. The user message is parsed to determine relevant data and metadata.

When parsing, the system 150 may determine the message type, the intent of the message, extract parameters from the message, and set user context for the purchase request message. After the plain text message has been parsed, the system 150 generates a purchase order object, which is an analog or represents a purchase order. The purchase order object may include metadata relating to the purchase request to identify the requester, item, quantity or amount, price, vendor, date, and other information, in order for a decision to be made regarding the request.

The system 150 routes the purchase order object to an approver associated with the requesting user. The approver, or authorization entity, may view an approval menu via an interface on an approver's device, including various action options, such as an Approve Action, a Deny Action, and a Skip Action.

Should the approver choose to take no action or to skip the approval of the order, the system 150 remains in the approval routing process, and the approver may take action on the order at a later time. If the order is rejected, a plain text message is generated and the denial of the purchase request is communicated to the user.

If the order is approved the system 150 initiates a payment method process, including determining the payment processor, determining required funding, determining current funding, and generating payment rules. With the payment method 530 determined, the system 150 performs a verification of funds 535. If funds are verified, the system 150 generates and routes a payment request through a third party API, to generate a payment token for the purchase specified in the plain message text.

The payment token and a notification of approval are put into a formatted payment message and delivered to the requesting user. Upon receipt of the payment message, the user may use the payment token at the prescribed vender to make a purchase. The payment token may take the form of any payment system token.

In some embodiments, once the purchase is complete, the system 150 initiates reconciliation process 570, where the purchase transaction is created and linked to the original purchase request, and stored in a transaction database. In some cases, a plain text message is generated and sent to the approver, so that the approver knows the purchase has been made and that the token has been used.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computerized method for managing purchasing operations within an organization, the method comprising:
   accessing one or more messages associated with an employee within the organization,
      wherein the one or more messages are sent between the employee and a virtual bot associated with a purchasing system, and
      wherein the one or more messages are received as electronic text messages or converted into electronic text messages;
   extracting, by the virtual bot and from the accessed one or more messages, purchase order information associated with a request from the employee within the organization to purchase an item or service;
   generating, by the virtual bot, a purchase order object using the extracted purchase order information,
      wherein the purchase order object includes parameters for the request to purchase the item or service;
   upon receiving authorization for the purchase order object, generating, by the virtual bot, a configurable digital credit object specific to the purchase order object,
      wherein the generated configurable digital credit object is configured to be utilized by the employee within the organization to purchase the requested item or service; and
      wherein the generated configurable digital credit object includes metadata restricting use of the configurable digital credit object only to the purchase of the requested item or service; and
   providing, by the virtual bot, the generated configurable digital credit object to the employee within the organization to purchase the requested item or service.

2. The method of claim 1, further comprising:
   receiving an indication that the employee within the organization has purchased the item or service using the generated configurable digital credit object; and
   generating an entry in a purchase order database of the organization for the purchase of the item or service,
      wherein the generated entry includes a description of the purchased item or service, information identifying a cost of the purchased item or service, information identifying the employee, and information identifying the configurable digital credit object used to purchase the item or service.

3. The method of claim 1, wherein generating a token configurable digital credit object specific to the item or service includes generating a virtual credit card having an authorization amount similar to a cost to purchase the item or service.

4. The method of claim 1, wherein generating a configurable digital credit object specific to the item or service includes generating a virtual currency object of an amount similar to an amount to purchase the item or service, wherein the virtual currency object includes metadata that identifies an associated purchase order object, the employee submitting the request to purchase the item or service, and a category assigned to the item or service.

5. The method of claim 1, wherein accessing one or more messages associated with an employee within the organization includes accessing the one or more messages within a conversation supported by a collaboration tool of the organization; and wherein providing the generated configurable digital credit object to the employee within the organization includes providing a virtual credit card to the employee via the collaboration tool.

6. The method of claim 1, wherein accessing one or more messages associated with an employee within the organization includes accessing the one or more messages within a messaging system of the organization.

7. The method of claim 1, further comprising:
determining the parameters of the purchase order object indicate a recurrence of the purchase order object being received by the purchasing system; and
automatically authorizing the purchase order object based on the purchase order object being a recurrence of a previously authorized purchase order object within the organization.

8. The method of claim 1, wherein extracting purchase order information associated with a request from the employee to purchase an item or service includes:
parsing the one or more messages to identify a description of the item or service, a vendor providing the item or service, and an amount to purchase the item or service.

9. At least one computer-readable medium, excluding transitory signals, carrying instructions, which when executed by at least one data processor, performs operations to manage purchasing operations within an organization, comprising:
accessing one or more messages associated with an employee within the organization,
wherein the one or more messages are sent between the employee and a virtual bot associated with a purchasing system, and
wherein the one or more messages are received as electronic text messages or converted into electronic text messages;
extracting, by the virtual bot and from the accessed one or more messages, purchase order information associated with a request from the employee within the organization to purchase an item or service;
generating, by the virtual bot, a purchase order object using the extracted purchase order information,
wherein the purchase order object includes parameters for the request to purchase the item or service;
upon receiving authorization for the purchase order object, generating, by the virtual bot, a configurable digital credit object specific to the purchase order object,
wherein the generated configurable digital credit object is configured to be utilized by the employee within the organization to purchase the requested item or service; and
wherein the generated configurable digital credit object includes metadata restricting use of the configurable digital credit object only to the purchase of the requested item or service; and
providing, by the virtual bot, the generated configurable digital credit object to the employee within the organization to purchase the requested item or service.

10. At least one computer-readable medium of claim 9, further comprising:
receiving an indication that the employee within the organization has purchased the item or service using the generated configurable digital credit object; and
generating an entry in a purchase order database of the organization for the purchase of the item or service,
wherein the generated entry includes a description of the purchased item or service, information identifying a cost of the purchased item or service, information identifying the employee, and information identifying the configurable digital credit object used to purchase the item or service.

11. At least one computer-readable medium of claim 9, wherein generating a configurable digital credit object specific to the item or service includes generating a virtual credit card having an authorization amount similar to a cost to purchase the item or service.

12. At least one computer-readable medium of claim 9, wherein generating a configurable digital credit object specific to the item or service includes generating a virtual currency object of an amount similar to an amount to purchase the item or service,
wherein the virtual currency object includes metadata that identifies an associated purchase order object, the employee submitting the request to purchase the item or service, and a category assigned to the item or service.

13. At least one computer-readable medium of claim 9, wherein accessing one or more messages associated with an employee within the organization includes accessing the one or more messages within a conversation supported by a collaboration tool of the organization; and wherein providing the generated configurable digital credit object to the employee within the organization includes providing a virtual credit card to the employee via the collaboration tool.

14. At least one computer-readable medium of claim 9, wherein accessing one or more messages associated with an employee within the organization includes accessing the one or more messages within a messaging system of the organization.

15. At least one computer-readable medium of claim 9, further comprising:
determining the parameters of the purchase order object indicate a recurrence of the purchase order object being received by the purchasing system; and
automatically authorizing the purchase order object based on the purchase order object being a recurrence of a previously authorized purchase order object within the organization.

16. At least one computer-readable medium of claim 9, wherein extracting purchase order information associated with a request from the employee to purchase an item or service includes:
parsing the one or more messages to identify a description of the item or service, a vendor providing the item or service, and an amount to purchase the item or service.

* * * * *